(12) United States Patent
Rasi

(10) Patent No.: US 12,521,407 B2
(45) Date of Patent: Jan. 13, 2026

(54) COMPOSITION FOR USE IN PREVENTION OR REDUCTION OF OXIDATIVE STRESS AND NEURODEGENERATIVE DISEASES

(71) Applicant: Simo Rasi, Oulu (FI)

(72) Inventor: Simo Rasi, Oulu (FI)

( * ) Notice: Subject to any disclaimer, the term of this patent is extended or adjusted under 35 U.S.C. 154(b) by 1127 days.

(21) Appl. No.: 17/603,895

(22) PCT Filed: Mar. 10, 2020

(86) PCT No.: PCT/FI2020/050150
§ 371 (c)(1),
(2) Date: Oct. 14, 2021

(87) PCT Pub. No.: WO2020/212645
PCT Pub. Date: Oct. 22, 2020

(65) Prior Publication Data
US 2022/0193098 A1 Jun. 23, 2022

(30) Foreign Application Priority Data
Apr. 18, 2019 (FI) ..................................... 20195318

(51) Int. Cl.
| | | |
|---|---|---|
| A61K 31/685 | (2006.01) | |
| A23L 33/00 | (2016.01) | |
| A23L 33/19 | (2016.01) | |
| A61K 31/205 | (2006.01) | |
| A61K 31/513 | (2006.01) | |
| A61K 35/20 | (2006.01) | |
| A61P 25/16 | (2006.01) | |
| A61P 25/28 | (2006.01) | |

(52) U.S. Cl.
CPC ............ *A61K 31/685* (2013.01); *A23L 33/19* (2016.08); *A23L 33/40* (2016.08); *A61K 31/205* (2013.01); *A61K 31/513* (2013.01); *A61K 35/20* (2013.01); *A61P 25/16* (2018.01); *A61P 25/28* (2018.01)

(58) Field of Classification Search
None
See application file for complete search history.

(56) References Cited

U.S. PATENT DOCUMENTS

| | | |
|---|---|---|
| 2001/0005719 A1 | 6/2001 | Von Borstel |
| 2001/0016576 A1 | 8/2001 | Von Borstel |
| 2010/0056484 A1 | 3/2010 | Farese |

FOREIGN PATENT DOCUMENTS

| | | | |
|---|---|---|---|
| CN | 1315835 A | 10/2001 | |
| FI | 103089 | 4/1999 | |
| FI | 103089 B | 4/1999 | |
| FI | 9865 U1 * | 8/2012 | ............... A61K 8/49 |
| FI | 9 865 | 11/2012 | |
| JP | H01-503235 A | 11/1989 | |
| NO | 95/02407 A1 | 1/1995 | |
| WO | 88/07860 A1 | 10/1988 | |
| WO | 02/40013 A1 | 5/2002 | |
| WO | 2013/008155 | 1/2013 | |
| WO | WO-2013008155 A1 * | 1/2013 | ........... A61K 31/715 |

OTHER PUBLICATIONS

Daniel et al. (ACS Chem. Neurosci. 2016, 7, 7, 952-963 (Year: 2016).*
International Search Report for PCT/FI2020/050150 dated Jul. 21, 2020, 4 pages.
Written Opinion of the ISA for PCT/FI2020/050150 dated Jul. 21, 2020, 7 pages.
Daniele et al., "Human Neural Stem Cell Aging Is Counteracted by [alpha]-Glycerylphosphorylethanolamine", ACS Chemical Neuroscience, vol. 7, No. 7, May 31, 2016, Milan, Italy, pp. 952-963.
Ribas et al., "l-Carnitine supplementation as a potential antioxidant therapy for inherited neurometabolic disorders", Amsterdam, NL, vol. 533, No. 2, Oct. 19, 2013, pp. 469-476.
Pietila et al., "Mitochondrial Function Determines the Viability and Osteogenic Potency of Human Mesenchymal Stem Cells", Tissue Engineering: Part C vol. 16, No. 3, Oulu, Finland, Oct. 15, 2009, 11 pages.
Wider et al., "Measuring Protein Concentrations by NMR Spectroscopy", Zurich, Switzerland, Aug. 5, 2005, 6 pages.
Office Action issued in Chinese Patent Application No. 202080025363.4 dated Feb. 11, 2023.
Office Action issued in Japanese Patent Application No. 2021-560558 dated Nov. 22, 2022.
Fathi et al., "L-carnitine contributes to enhancement of neurogenesis from mesenchymal stem cells through Wnt/β-catenin and PKA pathway," Experimental Biology and Medicine, vol. 242, No. 5, Jan. 5, 2017, pp. 482-486.

* cited by examiner

*Primary Examiner* — John S Kenyon
*Assistant Examiner* — Rehana Ismail
(74) *Attorney, Agent, or Firm* — NIXON & VANDERHYE

(57) ABSTRACT

Disclosed is compositions including L-carnitine and orotic acid and glyceryl phosphoryl ethanolamine for use in prevention of oxidative stress of cells. The compositions are also suitable for use in preventing and/or correcting neurodegenerative damages in a subject suffering from one Parkinson disease, Huntington disease and Alzheimer disease. Also disclosed is a colostrum-based dietary supplement enriched with L-carnitine and orotic acid and glyceryl phosphoryl ethanolamine.

19 Claims, 4 Drawing Sheets

COMPOSITION FOR USE IN PREVENTION OR REDUCTION OF OXIDATIVE STRESS AND NEURODEGENERATIVE DISEASES

This application is the U.S. national phase of International Application No. PCT/FI2020/050150 filed Mar. 10, 2020 which designated the U.S. and claims priority to FI patent application No. 20195318 filed Apr. 18, 2019, the entire contents of each of which are hereby incorporated by reference.

BACKGROUND OF THE INVENTION

Field of the Invention

The present invention relates to compositions for protecting cells, in particular nervous cells from oxidative stress wherein the composition comprises O-(L-α-glyceryl phosphoryl) ethanolamine, L-carnitine and orotic acid.

Description of the Related Art

Oxidative stress reflects an imbalance between the systemic manifestation of reactive oxygen species and a biological system's ability to readily detoxify the reactive intermediates or to repair the resulting damage. Disturbances in the normal redox state of cells can cause toxic effects through the production of peroxides and free radicals that damage all components of the cell, including proteins, lipids, and DNA. Oxidative stress from oxidative metabolism causes base damage, as well as strand breaks in DNA. Base damage is mostly indirect and caused by reactive oxygen species generated, e.g. superoxide radical, hydroxyl radical and hydrogen peroxide. Further, some reactive oxidative species act as cellular messengers in redox signaling. Thus, oxidative stress can cause disruptions in normal mechanisms of cellular signaling.

In humans, oxidative stress is thought to be unweighted in the development of various diseases including Parkinson's disease, Huntington's disease and Alzheimer's disease.

Epidemiological and clinical studies suggest that natural products can combat oxidative stress and reduce the morbidity and mortality associated with chronic diseases. For example, Daniele et al. have demonstrated that α-glycerylphosphoryl ethanolamine (GPEA), a precursor of the main constituents of the cellular phosphatidylethanolamine and phosphatidylcholine, is able to protect neural stem cells from oxidative stress (ACS Neuroscience, 2016, DOI: 10.1021/acschemneuro.6b000778).

FI 9865U1 discloses a composition comprising vitamin BT, i.e. L-carnitine and vitamin B13, i.e. orotic acid. The composition prevents oxidative stress of mesenchymal stem cells.

US 2001016576A1 discloses compositions and methods for treating mitochondrial diseases, e.g. neurodegenerative disorders, such as Alzheimer's disease, Parkinson's disease and Huntington's disease. The composition disclosed therein comprises e.g. orotic acid and L-carnitine.

Ribas et al. (Gene, 2012, Vol 533, pp 469-476) discloses a neuroprotective effect of L-carnitine.

FI 103089 discloses a colostrum-based dietary composition comprising L-carnitine and other nutritional factors.

However, there is still need for new composition to prevent oxidative stress of cells.

SUMMARY OF THE INVENTION

In the present invention it was found that a composition comprising α-glyceryl-phosphoryl ethanolamine (GPEA), L-carnitine and orotic acid can prevent or at least reduce oxidative stress of cells as a function of the composition concentration. It was also found that colostrum includes significant amounts of GPEA.

According to one aspect the present invention concerns a composition comprising L-carnitine, orotic acid and GPEA for use in prevention of oxidative stress of cells.

According to another aspect, the present invention concerns a composition comprising L-carnitine, orotic acid and O-(L-α-glyceryl phosphoryl) ethanolamine for use in prevention of neurodegenerative damages in a subject suffering from one or more of Parkinson disease, Huntington disease, and Alzheimer disease.

According to a still another aspect, the present invention concerns a colostrum-based dietary supplement enriched with O-(L-α-glyceryl phosphoryl) ethanolamine, orotic acid and L-carnitine.

According to a still another aspect, the present invention concerns a composition comprising O-(L-α-glyceryl phosphoryl) ethanolamine, orotic acid and L-carnitine.

Further objects of the present invention are disclosed and claimed.

Exemplifying and non-limiting embodiments of the invention, both as to constructions and to methods of operation, together with additional objects and advantages thereof, are best understood from the following description of specific exemplifying embodiments when read in connection with the accompanying drawings.

The verbs "to comprise" and "to include" are used in this document as open limitations that neither exclude nor require the existence of unrecited features. The features recited in the accompanied depending claims are mutually freely combinable unless otherwise explicitly stated. Furthermore, it is to be understood that the use of "a" or "an", i.e. a singular form, throughout this document does not exclude a plurality.

BRIEF DESCRIPTION OF THE DRAWINGS

FIG. 2E) shows an apoptosis control.

DESCRIPTION OF THE PREFERRED EMBODIMENTS

Figure 1:
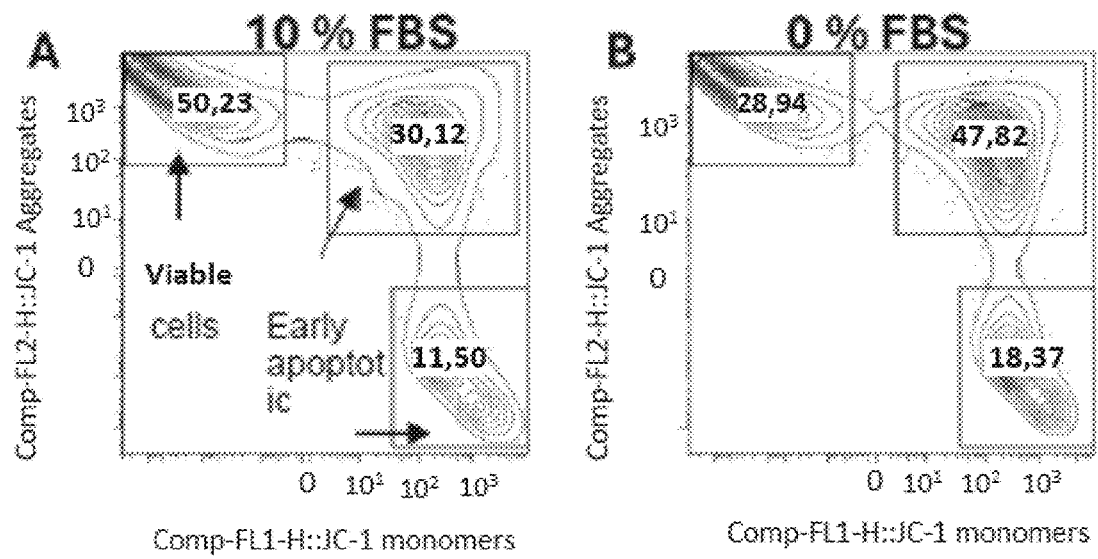
FIG. 1A shows contour plots from flow cytometry analysis of control cells in the presence of 10% by weight FSB and FIG. 1B shows increase of apoptosis after 2 h of FSB depletion.

As defined herein oxidative stress is an indication which reflects an imbalance between the systemic manifestation of reactive oxygen species and a biological system's ability to readily detoxify the reactive intermediates or to repair the resulting damage.

According to one embodiment the present invention comprises a composition comprising L-carnitine, orotic acid and O-(L-α-glyceryl phosphoryl) ethanolamine for use in preventing or reducing oxidative stress of cells. The cells are preferably selected from human cells, in particular human neural stem cells and human nerve cells.

L-Carnitine (L-β-hydroxy-γ-N-trimethylaminobutyric acid, 1), also called vitamin $B_T$, is a substance that transfers long chain fatty acids through the inner membrane of mitochondria to energy production by beta oxidation.

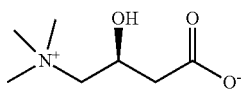

Orotic acid (2), also called vitamin $B_{13}$ is a necessary growth factor for some lactic acid bacteria (including *Lactobacillus bulgaricus*).

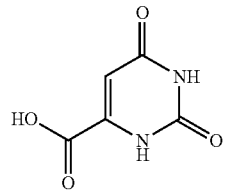

O-(L-α-glyceryl phosphoryl) ethanolamine (GPEA, 3) is a precursor of the main constituents of cellular phosphatidylethanolamine and phosphatidyicholine.

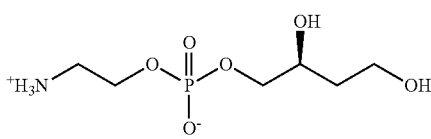

According to an exemplary embodiment the composition comprises also one or more nutrient factors typically used in dietary supplements. Exemplary nutrient factors are omega-3-fatty acids, minerals, vitamins.

The composition can be in liquid, solid or semi-solid form or a suspension. According to an exemplary embodiment the composition is liquid.

According to a particular embodiment the composition is liquid, and concentration of L-carnitine in the composition is preferably 0.01-5% by weight. According to another preferable embodiment the concentration of L-carnitine in the composition 0.01-20% by weight. An exemplary L-carnitine concentration in the composition is 10% by weight.

According to another embodiment the composition is liquid and concentration of orotic acid in the composition is 0.01-5% by weight. According to another embodiment concentration of orotic acid in the composition is 0.01-20% by weight, such as 0.01-5% by weight. A particular orotic acid concentration in the composition is 0.1% by weight which is the maximum concentration of orotic acid in certain body tissues and body fluids.

According to another embodiment the composition is liquid, and GPEA concentration in the composition is preferably 0.01-20% by weight such as 0.01-5% by weight. According to a particular embodiment orotic acid concentration in the composition is 0.1% by weight, and effect of the composition is tuned by adjusting the concentration of GPEA and L-carnitine.

According to a particular embodiment, the composition is liquid, and it comprises 170 mg GPEA/liter and 68 mg L-carnitine/liter. According to another embodiment, the composition is liquid, and it comprises 1000 mg GPEA/liter and 1000 mg L-carnitine/liter. According to still another embodiment, the composition is liquid, and it comprises 800 mg GPEA/liter, 400 mg L-carnitine/liter. Exemplary daily dose is 250 mL.

According to a particular embodiment the composition comprises whey, in particular colostrum whey.

According to still another particular embodiment the composition comprises colostrum.

According to another embodiment the present invention concerns a composition comprising L-carnitine, orotic acid and GPEA for use in preventing and preferably also correcting neurodegenerative damages in a subject suffering from one or more of Parkinson disease, Huntington disease, and Alzheimer disease.

The composition can be in liquid, solid or semi-solid form or a suspension. According to an exemplary embodiment the composition is liquid. According to a particular embodiment, the composition is liquid, and it comprises 170 mg GPEA/liter and 68 mg L-carnitine/liter. According to another embodiment, the composition is liquid, and it comprises 1000 mg GPEA/liter and 1000 mg L-carnitine/liter. According a particular embodiment this composition is used for treating a subject suffering from Parkinson disease. Exemplary daily dose is 250 mL.

According to still another embodiment, the composition is liquid, and it comprises 800 mg GPEA/liter, 400 mg L-carnitine/liter. According a particular embodiment this composition is used for treating a subject suffering from Alzheimer disease. Exemplary daily dose is 250 mL.

It is well known that colostrum includes L-carnitine and orotic acid. It was also observed in the present invention that colostrum includes also GPEA, and that typical GPEA concentration in colostrum is 170 mg/L. However, the concentrations of these components are not high enough to be able to reduce oxidative stress.

The present invention concerns also a colostrum-based dietary supplement enriched with GPEA, L-carnitine and orotic acid. The term "colostrum-based" should be understood that the composition comprises colostrum as the main component.

According to an exemplary non-limiting embodiment the colostrum-based dietary supplement of the present invention is manufactured by a process comprising the following steps:

a) providing colostrum as a solution
b) adding to the solution
   GPEA so that GPEA concentration in the solution is preferably 0.01-20% by weight, such as 0.01-5% by weight
   L-carnitine so that L-carnitine concentration in the solution is preferably 0.01-20% by weight, such as 0.01-5% by weight orotic acid so that orotic acid concentration in the solution is preferably 0.01-20% by weight, more preferably 0.1% by weight, and optionally c) evaporating or concentrating the solution According to a preferable embodiment, the step c) includes freeze-drying.

According to a particular embodiment, the adding step includes adding one or more nutritional factors such as omega-3-fatty acids, minerals and vitamins.

The process may also include determining one or more of GPEA, L-carnitine, and orotic acid concentration of the colostrum prior step b).

It is obvious for a skilled person that the process can be varied. For example, the colostrum is provided as a solid, e.g. as freeze-dried material, and the GPEA, L-carnitine, and orotic acid are added as solid materials.

According to another embodiment the present invention concerns a composition comprising L-carnitine, orotic acid and O-(L-α-glyceryl phosphoryl) ethanolamine (GPEA) and preferably also one or more nutritional factors. The nutritional factors are preferably selected from omega-3 fatty acids, minerals, vitamins. According to a particular embodiment the composition comprises whey. A particular whey is colostrum whey.

The composition is in form of liquid, suspension, semi-solid or solid, preferably liquid.

L-carnitine concentration of the composition is typically 0.01-20% by weight, such as 0.01-5% by weight. Orotic acid concentration of the composition is typically 0.01-20% by weight, such as 0.01-5% by weight, preferably 0.1% by weight. GPEA concentration of the composition is typically 0.01-20% by weight, such as 0.01-5% by weight.

EXPERIMENTAL

Mitochondrial membrane potential probe (JC-1 dye) was purchased from Sigma-Aldrich. Fluorescence intensity measurements were performed by using flow cytometry (FacsCalibur and Accuri C6 instruments of Becton Dickinson).

The assays were performed as disclosed earlier (Pietilä et al. 2010 Tissue Eng. Journal Part C Method 16(3):435). Shortly, human Mesenchymal Stem Cells (hMSCs) were distributed in 6-well plates (100 000 cells/well) and allowed to fix overnight. Control cells were cultured in a solution comprising 10% (by volume) FSB. Apoptosis was initiated by culturing the cells in the absence of FSB for 2 h.

Comparative Example

A comparative composition was prepared by admixing 24 mg orotic acid, 200 mg L-carnitine and 41 mg hyaluronate (viscosity enhancer) in 20 mL water, and pH was adjusted to 7. The admixture was sterile filtered. The admixture was diluted to an FBS-free culture medium to give rise to a 2.5%, 5% and 10% (by volume) solution of the composition, which were added to the cells. All measurements were performed as triplicates. For the Δψm analysis, carbonyl cyanide m-chlorophenylhydrazone (CCCP) was used as a positive control. The strength of the red/green (PE/FITC) ratio of the JC-1 probe represents the welfare of the cells, while the degrease of the ratio is an indication of increased oxidative stress.

Example

A composition of the present invention was prepared by admixing 100 mg GPEA, 24 mg orotic acid ($B_{13}$), 200 mg L-carnitine ($B_T$) and 41 mg hyaluronate (viscosity enhancer) in 20 mL water, and pH was adjusted to 7. The admixture was sterile filtered. The admixture was diluted to Supplement Mix-free and FBS-free culture medium to give rise to a 2.5%, 5.0% and 10% (by volume) solution of the composition, which were added to the cells. All measurements were performed as duplicates. For the Δψm analysis, carbonyl cyanide m-chlorophenylhydrazone (CCCP) was used as a positive control. The strength of the red/green (PE/FITC) ratio of the JC-1 probe represents the welfare of the cells, while the degrease of the ratio is an indication of increased oxidative stress. The comparative compositions did not include GPEA.

$^1$H and $^{31}$P NMR analyses of colostrum were performed with Bruker Ascend 600 MHz NMR-spectrometer at 298 K. GPEA concentration was calculated by using PULCON method (Wider G & Dreier L, 2006, J. Am. Chem. Soc. 128(8): 2571-2576). GPEA concentration was 0.8 mM, i.e. 170 mg/L.

Results

FIG. 1 shows the effect of culturing the hMSCs in the presence A) and B) absence of FSB. As clearly seen from the figure, culturing the cells for 2 h in the absence of FSB induces apoptosis.

Figure 2:
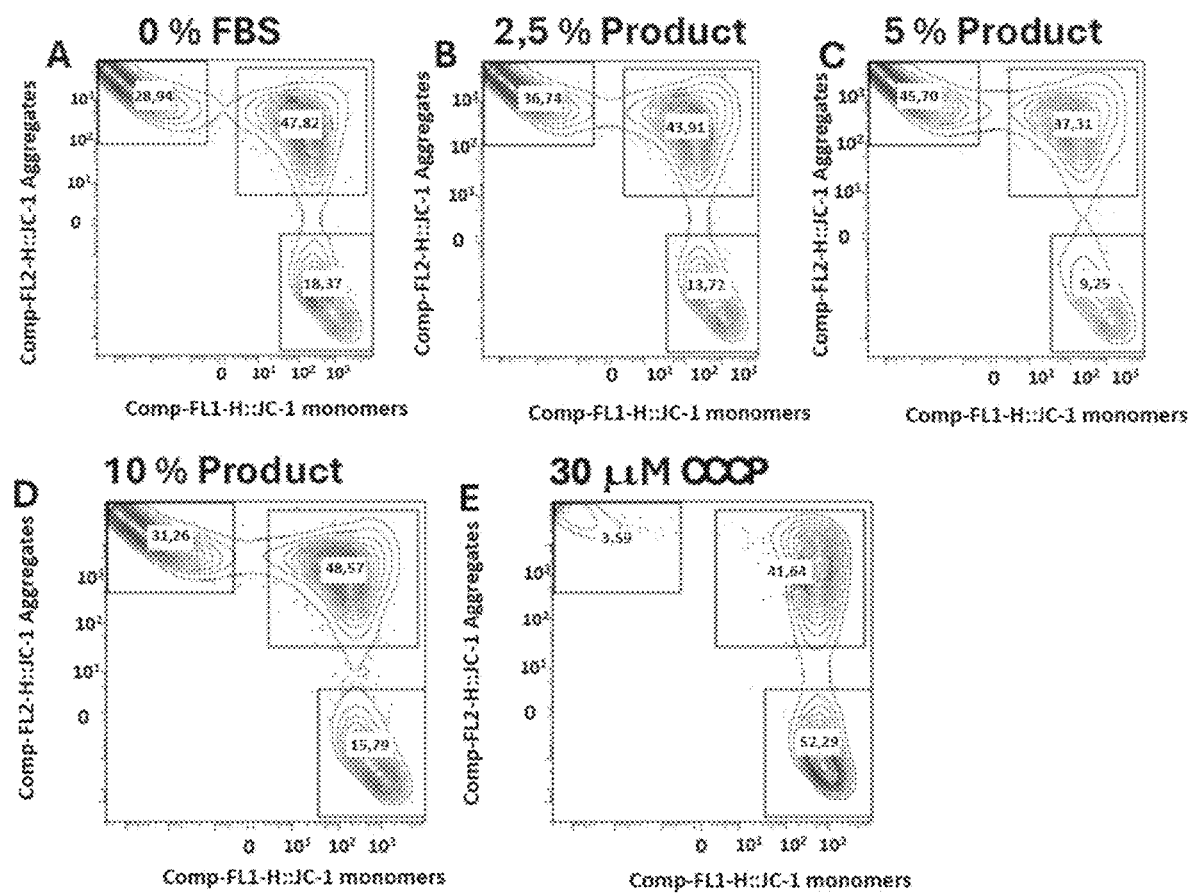
FIG. 2 shows cytoprotective effect of a composition comprising orotic acid and L-carnitine as a function of composition concentration A) 0% the composition; B) 2.5% by weight of the composition; C) 5% by weight of the composition; D) 10% by weight of the composition; E) 30 μmol carbonyl cyanide m-chlorophenylhydrazone (CCCP).
Figure 3:
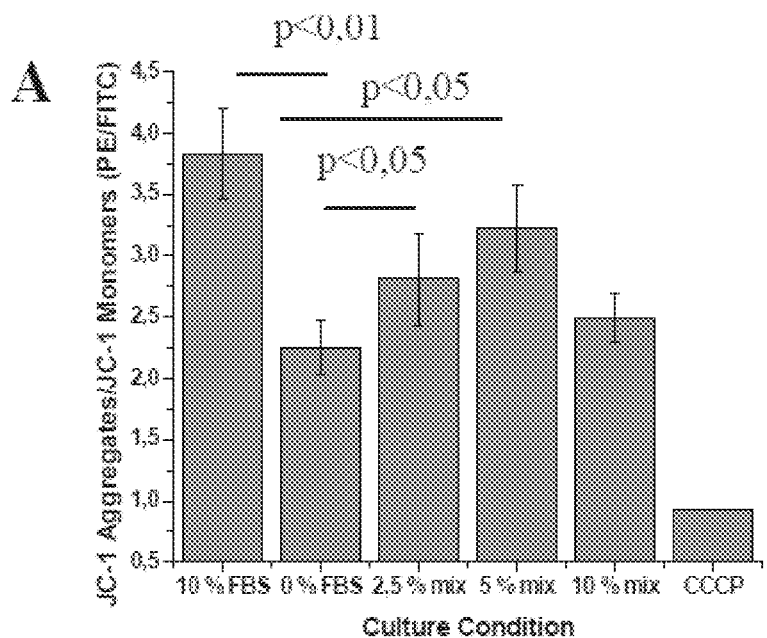
FIG. 3 shows red to green ratio of JC-1 intensities of cells incubated with 10% by weight FEB, 0% FEB, 2.5%, 5% and 10% by weight of the composition comprising orotic acid and L-carnitine. CCCP is an apoptosis control.

FIG. 2 shows cytoprotective effect of a composition comprising orotic acid and L-carnitine during serum depletion as a function of composition concentration. Figure A) and E) shows negative and positive controls, respectively. As shown therein a composition comprising 2.5% and 5% of orotic acid and L-carnitine protects the cells against oxidative stress, while the 10% composition did not increase the protective effect. In fact, the presence of viable cells started to reduce significantly. The situation is more clearly seen from FIG. 3 disclosing red to green ratios of JC-1 intensities.

Figure 4:
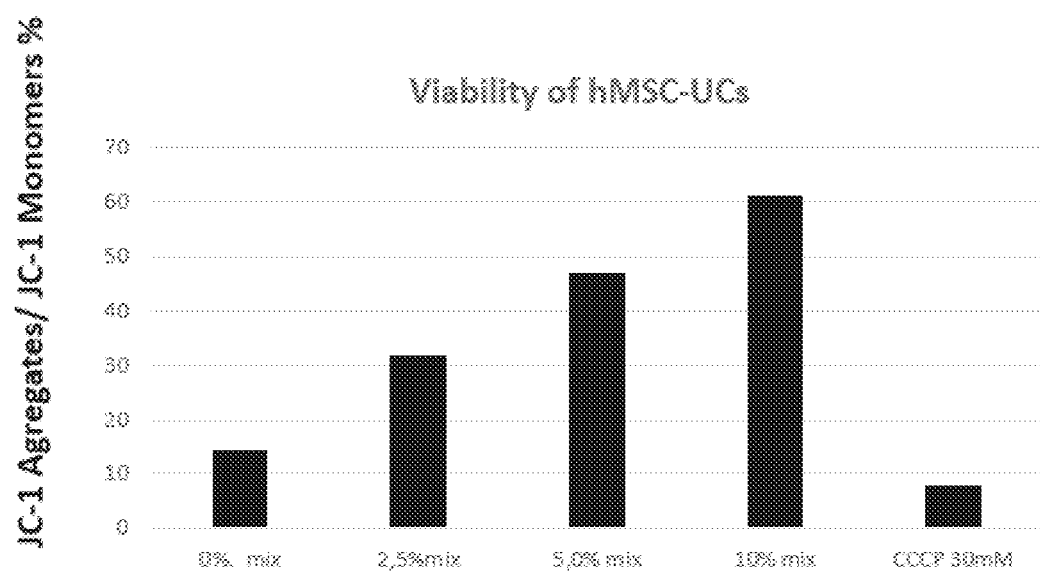
FIG. 4 shows viability of hMSC-UC cells in the absence and presence of various concentrations of an exemplary non-limiting composition of the present invention. CCCP is an apoptosis control.
Figure 5:
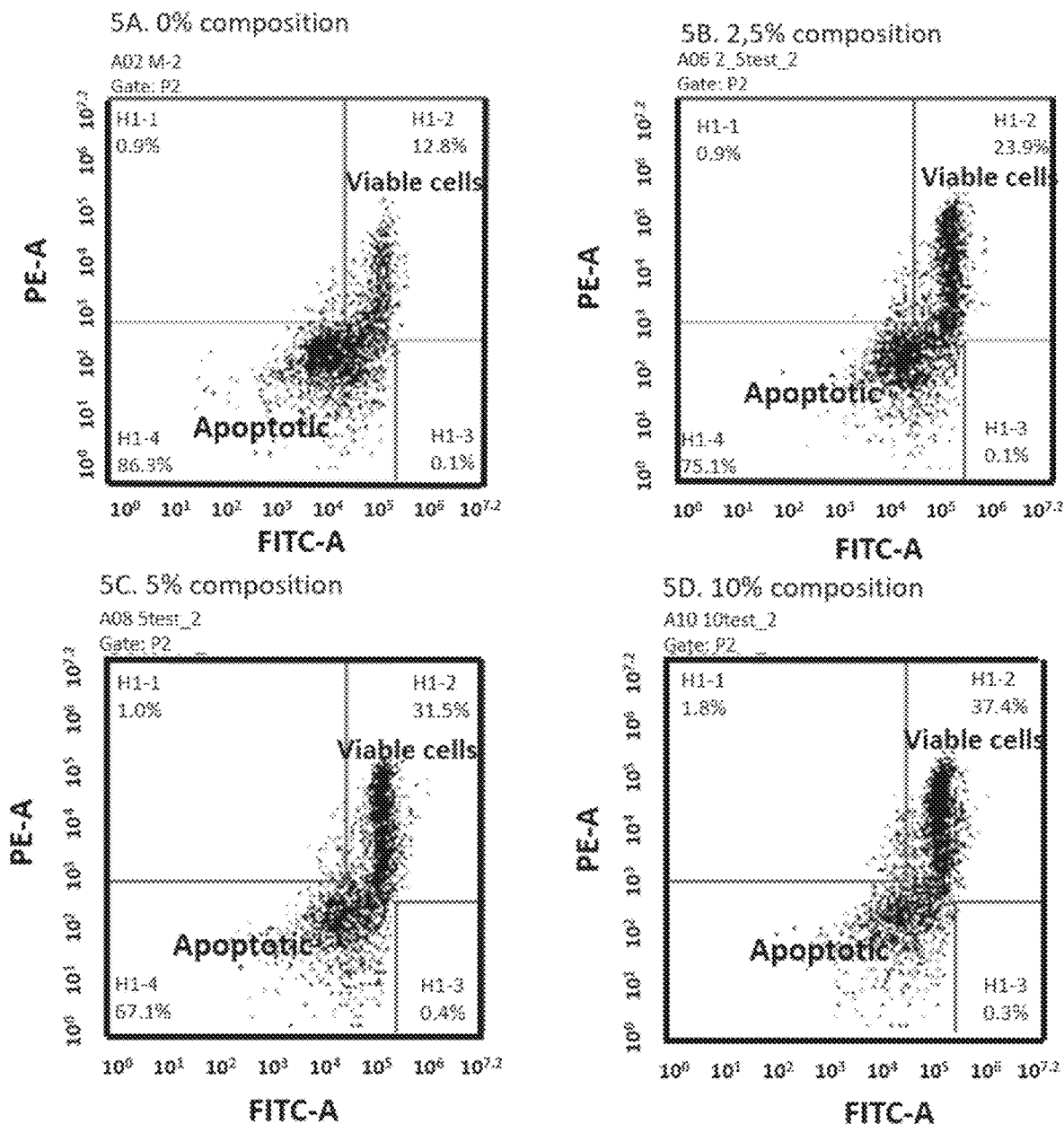
FIG. 5 shows flow cytometric analysis of the mitochondrial membrane potential in hMSC-US cells in the absence A) and presence B)-D) of various concentrations of an exemplary non-limiting composition comprising L-carnitine, orotic acid and O-(L-α-glyceryl phosphoryl) ethanolamine.
Figure 5:
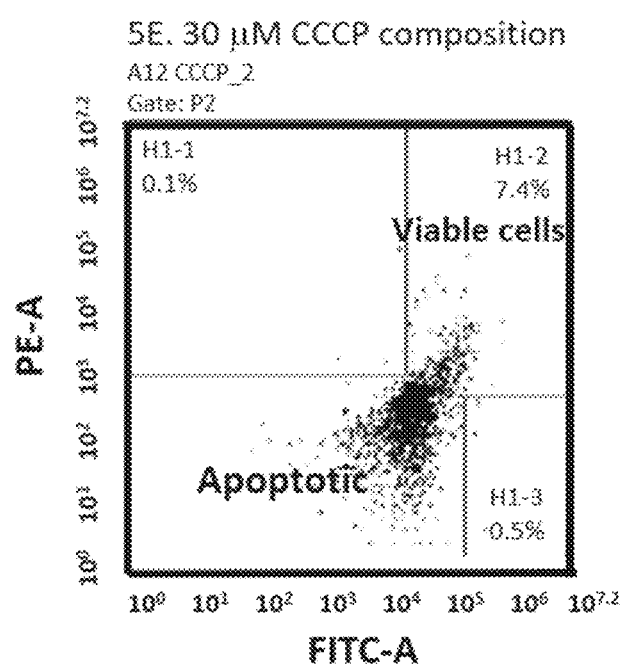

FIG. 4 shows viability of hMSC-UC cells in the absence and presence of various concentrations of an exemplary composition of the present invention. In strict contrast of the admixture not including GPEA shown in FIG. 3, the viability of the cells increased linearly as a function of the composition concentration. The effect can also be detected from the flow cytometric analysis of the mitochondrial membrane potential of the hMSC-UC cells as shown in FIG. 5. This is an important indication since significant concentrations are essential to give rise to desired protective effect in target organs, in particular brains.

The specific examples provided in the description given above should not be construed as limiting the scope and/or the applicability of the appended claims.

What is claimed is:

1. A composition comprising L-carnitine, orotic acid and O-(L-α-glyceryl phosphoryl) ethanolamine (GPEA) for use in prevention and/or reduction of oxidative stress of cells, wherein the cells are human mesenchymal stem cells and L-carnitine concentration of the composition is 0.01-20% by weight, orotic acid concentration of the composition is 0.01-20% by weight and GPEA concentration of the composition is 0.01-20% by weight.

2. The composition according to claim 1, further comprising one or more nutritional factors.

3. The composition according to claim 2, wherein the one or more nutritional factors are selected from omega-3 fatty acids, minerals, and vitamins.

4. The composition according to claim 1, wherein the composition comprises whey.

5. The composition according to claim 1, wherein the composition is in form of liquid, suspension, semi-solid or solid.

6. The composition according to claim 4, wherein the whey is colostrum whey.

7. The composition according to claim 5, wherein the composition is in form of liquid.

8. The composition according to claim 2, wherein the composition comprises whey.

9. The composition according to claim 3, wherein the composition comprises whey.

10. The composition according to claim 2, wherein the composition is in form of liquid, suspension, semi-solid or solid.

11. The composition according to claim 3, wherein the composition is in form of liquid, suspension, semi-solid or solid.

12. The composition according to claim 4, wherein the composition is in form of liquid, suspension, semi-solid or solid.

13. The composition according to claim 8, wherein the composition is in form of liquid, suspension, semi-solid or solid.

14. The composition according to claim 9, wherein the composition is in form of liquid, suspension, semi-solid or solid.

15. The composition according to claim 1, wherein the L-carnitine concentration of the composition is 0.01-5% by weight.

16. The composition according to claim 1, wherein the L-carnitine concentration of the composition is 10% by weight.

17. The composition according to claim 1, wherein the orotic acid concentration of the composition is 0.01-5% by weight.

18. The composition according to claim 1, wherein the orotic acid concentration of the composition is 0.1% by weight.

19. The composition according to claim 1, wherein the GPEA concentration of the composition is 0.01-5% by weight.

* * * * *